US006792009B2

(12) United States Patent
Putnam et al.

(10) Patent No.: US 6,792,009 B2
(45) Date of Patent: Sep. 14, 2004

(54) TUNABLE GRATING-BASED CHANNEL FILTER PARKING DEVICE

(75) Inventors: Martin A. Putnam, Cheshire, CT (US); Alan D. Kersey, South Glastonbury, CT (US); Timothy J. Bailey, Longmeadow, MA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/226,944

(22) Filed: Aug. 22, 2002

(65) Prior Publication Data

US 2003/0035628 A1 Feb. 20, 2003

Related U.S. Application Data

(63) Continuation-in-part of application No. 10/224,157, filed on Aug. 20, 2002, which is a continuation-in-part of application No. 09/675,455, filed on Sep. 28, 2000, now abandoned, and a continuation-in-part of application No. 09/455,868, filed on Dec. 6, 1999, and a continuation-in-part of application No. 09/455,865, filed on Dec. 6, 1999, now Pat. No. 6,519,388, which is a continuation-in-part of application No. 09/399,495, filed on Sep. 20, 1999, now abandoned, which is a continuation-in-part of application No. 09/205,943, filed on Dec. 4, 1998, now abandoned, application No. 10/226,944, which is a continuation-in-part of application No. 09/675,456, filed on Sep. 28, 2000, now abandoned, application No. 10/226,944, which is a continuation-in-part of application No. 10/146,773, filed on May 16, 2002, now Pat. No. 6,597,711, which is a continuation-in-part of application No. 09/707,084, filed on Nov. 6, 2000, now abandoned, which is a continuation-in-part of application No. 09/691,997, filed on Oct. 19, 2000, now Pat. No. 6,363,089, which is a continuation of application No. 09/456,112, filed on Dec. 6, 1999, now Pat. No. 6,229,827, which is a continuation-in-part of application No. 09/400,362, filed on Sep. 20, 1999, now abandoned, which is a continuation-in-part of application No. 09/205,846, filed on Dec. 4, 1998, now abandoned, application No. 10/226,944, which is a continuation-in-part of application No. 09/699,940, filed on Oct. 3, 2000, now Pat. No. 6,621,957, which is a continuation-in-part of application No. 09/519,240, filed on Mar. 6, 2000, now abandoned, application No. 10/098,890, filed on Mar. 15, 2002, which is a continuation-in-part of application No. 09/675,456, filed on Sep. 28, 2000, application No. 10/226,944, which is a continuation-in-part of application No. 09/950,509, filed on Sep. 10, 2001, now Pat. No. 6,563,968, which is a continuation-in-part of application No. 09/519,802, filed on Mar. 16, 2000, now Pat. No. 6,310,990, application No. 10/226,944, which is a continuation-in-part of application No. 10/098,923, filed on Mar. 16, 2002.

(60) Provisional application No. 60/276,456.

(51) Int. Cl.[7] ............................................. H01S 3/30
(52) U.S. Cl. .......................... 372/6; 372/20; 385/37
(58) Field of Search ................................. 372/6, 64, 20, 372/92; 385/37, 24

(56) References Cited

U.S. PATENT DOCUMENTS 4,725,110 A   2/1988   Glenn et al. ............... 350/3.61

(List continued on next page.)

FOREIGN PATENT DOCUMENTS

EP          0997764          5/2000

(List continued on next page.)

OTHER PUBLICATIONS

Putnam et al; "Fabrication of tapered, strain–gradent chirped fibre Bragg gratings", Electronic Letters, IEE Stevenage, GB, vol. 31, No. 4, 309–310, 2/95.

(List continued on next page.)

*Primary Examiner*—Hung X. Dang (57) ABSTRACT

An optical filter, including a Bragg grating, is compression tuned such that when under one compressional load (or no load) the grating has a first profile and under a second compressional load the grating has a second profile. One application is to allow the grating filter function to be parked optically between channels of a WDM or DWDM optical system.

18 Claims, 5 Drawing Sheets

U.S. PATENT DOCUMENTS

| | | | |
|---|---|---|---|
| 4,807,950 A | 2/1989 | Glenn et al. | 350/3.61 |
| 4,915,467 A | 4/1990 | Berkey | 350/96.15 |
| 5,007,705 A | 4/1991 | Morey et al. | 350/96.29 |
| 5,042,898 A | 8/1991 | Morey et al. | 385/37 |
| 5,235,659 A | 8/1993 | Atkins et al. | 385/124 |
| 5,388,173 A | 2/1995 | Glenn | 385/37 |
| 5,469,520 A | 11/1995 | Morey et al. | 385/37 |
| 5,579,143 A | 11/1996 | Huber | 359/130 |
| 5,691,999 A | 11/1997 | Ball et al. | 372/20 |
| 5,706,375 A | 1/1998 | Mihailov et al. | 385/24 |
| 5,726,785 A | 3/1998 | Chawki et al. | 359/130 |
| 5,745,626 A | 4/1998 | Duck et al. | 385/96 |
| 5,748,349 A | 5/1998 | Mizrahi | 359/130 |
| 6,020,986 A | 2/2000 | Ball | 359/130 |
| 6,148,127 A | 11/2000 | Adams et al. | 385/37 |
| 6,229,827 B1 * | 5/2001 | Fernald et al. | 372/20 |
| 6,275,629 B1 | 8/2001 | Eggleton et al. | 385/37 |
| 6,307,988 B1 | 10/2001 | Eggleton et al. | 385/37 |

FOREIGN PATENT DOCUMENTS

| | | |
|---|---|---|
| EP | 1024376 | 8/2000 |
| EP | 1026540 | 8/2000 |
| EP | 1030472 | 8/2000 |
| EP | 1063545 | 12/2000 |
| EP | 1065813 | 1/2001 |
| EP | 1065821 | 1/2001 |
| WO | WO 8204328 | 12/1982 |
| WO | WO 9530926 | 11/1995 |
| WO | WO 9626458 | 8/1996 |
| WO | WO 0037969 | 6/2000 |
| WO | WO 0039617 | 7/2000 |

OTHER PUBLICATIONS

Shin et al, "Design and implementation of PCB–type capacitance displacement sensor collocated with magnetic bearings", Sensors and Actuators, vol. 71, No. 3, 12/98.

* cited by examiner

TUNABLE GRATING-BASED CHANNEL FILTER PARKING DEVICE

CROSS-REFERENCE TO RELATED APPLICATIONS

This is a continuation-in-part application of U.S. patent application Ser. No. 09/675,456, filed Sep. 28, 2000 now abandoned; U.S. patent application Ser. No. 10/224,157, filed Aug. 20, 2002, which is a continuation-in-part of U.S. patent application Ser. No. 09/675,455, filed Sep. 28, 2000 now abandoned; U.S. patent application Ser. No. 09/455,868, filed Dec. 6, 1999; U.S. patent application Ser. No. 09/455,865, filed Dec. 6, 1999 now U.S. Pat. No. 6,519,388, which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; U.S. patent application Ser. No. 10/146,773, filed May 16, 2002 now U.S. Pat. No. 6,597,711, which is a continuation-in-part of U.S. application Ser. No. 09/707,084, filed Nov. 6, 2000 now abandoned, which is a continuation-in-part of U.S. patent application Ser. No. 09/691,997, filed Oct. 19, 2000, now granted (U.S. Pat. No. 6,363,089), which is a continuation of U.S. patent application Ser. No. 09/456,112, filed Dec. 6, 1999, now granted (U.S. Pat. No. 6,229,827), which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; U.S. application Ser. No. 09/699,940, filed Oct. 30, 2000 now U.S. Pat. No. 6,621,957, which is a continuation-in-part of U.S. patent application Ser. No. 09/519,240, filed Mar. 6, 2000, now abandoned; and U.S. Provisional Application No. 60/276,456, filed Mar. 16, 2001; U.S. patent application Ser. No. 10/098,890, filed Mar. 15, 2002, which is a continuation-in-part of U.S. patent application Ser. No. 09/675,456, filed Sep. 28, 2000; U.S. patent application Ser. No. 09/950/509, filed Sep. 10, 2001 now U.S. Pat. No. 6,563,968, which is a continuation-in-part of U.S. patent application Ser. No. 09/519,802, filed Mar. 16, 2000, now granted (U.S. Pat. No. 6,310,990); and U.S. patent application Ser. No. 10/098,923, all of which are incorporated herein by reference in their entirety.

TECHNICAL FIELD

The present invention relates to DWDM channel filters, and more particularly to DWDM channel filters based on a Bragg grating that allows the filter function to be parked between DWDM channels.

BACKGROUND ART

It is known that wavelength division multiplexing (WDM) uses different wavelengths (or wavelength bands) of light to carry information along an optical fiber, each wavelength band representing a different channel. Each channel has a predetermined bandwidth and the channels are each spaced a predetermined distance apart (based on the stability, dispersion and other optical characteristics of the network). As the demand for bandwidth increases, the spacing between channels becomes closer to create a dense wavelength division multiplexed (DWDM) system. For example, for a 200 GHz system, the spacing between the center of two adjacent wavelength channels is about 1600 picometers (or 1.6 nanometers), for a 100 GHz system, the spacing is about 800 picometers, for a 50 GHz system, the channel spacing is about 400 picometers, and for a 25 GHz system, the channel spacing is about 200 picometers. Also, the width of the channel is dependent on the data rate of the signals carried on each channel.

As is known, fiber Bragg gratings can be used as effective filter elements in a range of applications in WDM and DWDM optical communications networks. For example tunable grating filters may be used in optical add drop multiplexers, such as those described in U.S. Pat. No. 6,020,986, to Ball, entitled "Programmable Add-Drop Module for use in an Optical Circuit", U.S. Pat. No. 5,726,785, to Chawki et al, entitled "Optical Add-Drop Multiplexer Using Optical Circulators and Photoinduced Bragg gratings", U.S. Pat. No. 5,748,349, to Mizrahi, entitled "Gratings Based Optical Add-Drop Multiplexers for WDM Optical Communications System", and U.S. Pat. No. 5,579,143, to Huber, entitled "Optical System with Tunable In-Fiber Gratings".

Such patents teach reflecting or blocking a channel using a fiber Bragg grating filter by tuning the Bragg grating reflect the channel and/or allowing a channel to pass by tuning the Bragg grating to be between channels, e.g., "parking" the grating between channels to be out of the way and not reflect the channel being passed.

SUMMARY OF THE INVENTION

An object of the present invention is to provide a tunable Bragg grating that provides for filtering WDM and DWDM channels and provides for parking the gratings filter function between such channels.

In accordance with an embodiment of the present invention, a tunable filter parking device comprises an optical waveguide that includes an outer cladding disposed about an inner core. A portion of the cladding includes a tapered region wherein the cladding has a minimum cross-sectional dimension of 0.3 mm. A chirped grating is written in the inner core of the tapered region of the cladding.

In accordance with another embodiment of the present invention, a tunable optical filter for dropping an optical channel from an input signal having a plurality of input channels is provided. The optical filter comprises a plurality of concatenated tunable filter parking devices. Each tunable filter parking device includes an optical waveguide having an outer cladding disposed about an inner core. A portion of the cladding includes a tapered region wherein the cladding has a minimum cross-sectional dimension of 0.3 mm. A chirped grating is written in the inner core of the tapered region of the cladding. A light directing device directs the input signal to the tunable filter parking device and directs at least one drop signal that is reflected from at least one of the tunable filter parking device to an output port.

In accordance with another embodiment of the present invention, an optical add/drop multiplexer for dropping and/or adding an optical channel of an input signal having a plurality of input channels is provided. The optical add/drop multiplexer comprises a plurality of concatenated tunable filter parking devices. Each tunable filter parking device includes an optical waveguide having an outer cladding disposed about an inner core. A portion of the cladding includes a tapered region, wherein the cladding has a minimum cross-sectional dimension of 0.3 mm. A chirped grating is written in the inner core of the tapered region of the cladding. A first light directing device directs the input signal to the tunable filter parking devices and directs at least one reflected drop signal to a drop port. A second light directing device directs an add signal to the tunable filter parking devices and directs at least one reflected add signal to an express port.

BEST MODE FOR CARRYING OUT THE INVENTION

Figure 1:
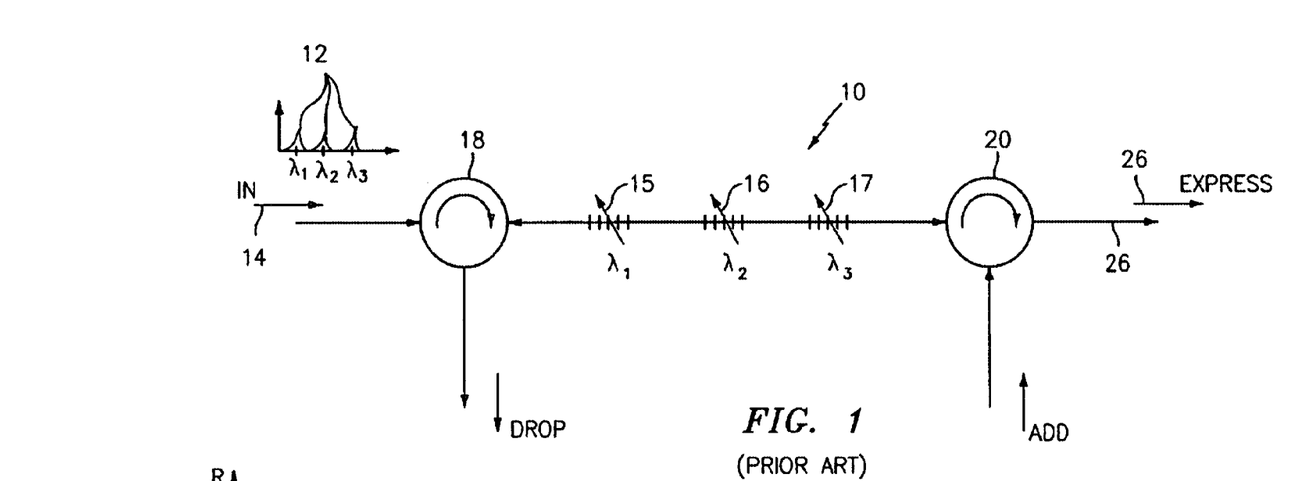
FIG. 1 is an optical schematic of a prior art optical add-drop multiplexer having tunable fiber gratings.
Figure 2:
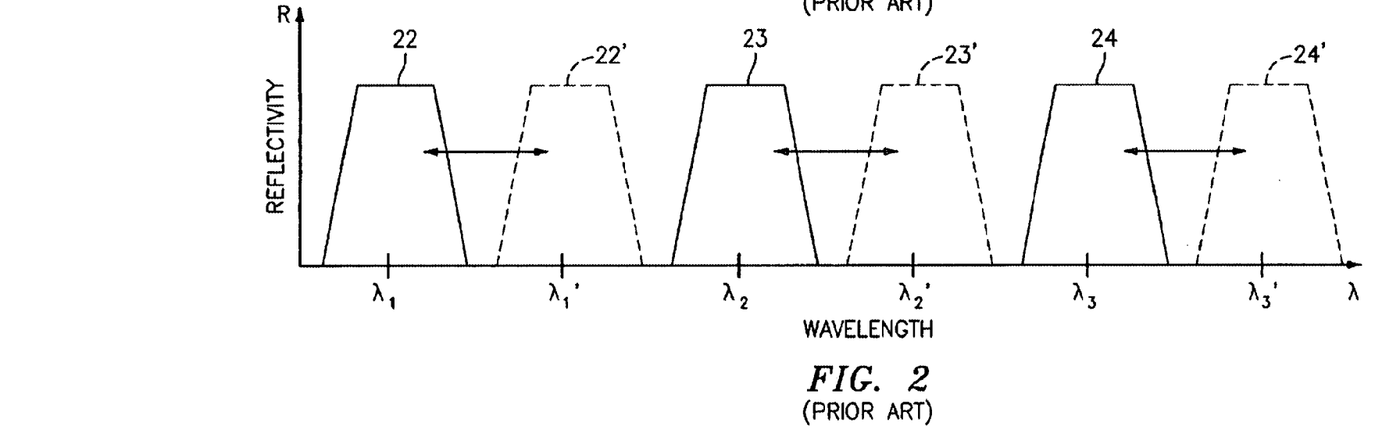
FIG. 2 is a graph showing grating filter parking between channels using the prior art system of FIG. 1.

Referring to FIG. 1, a prior art optical add/drop device (OADM) 10 is shown for adding and dropping at least one optical channel 12 from a WDM input signal 14, which includes a plurality of optical channels or wavelength bands of light centered at respective center wavelengths (i.e., $\lambda_1$, $\lambda_2$, $\lambda_3$). The OADM 10 includes a plurality of tunable fiber gratings 15–17 optically coupled between a pair of circulators 18,20 (i.e., light directing devices). Each fiber gratings 15–17 has a respective filter function 22–24 centered at respective center wavelengths (i.e., $\lambda_1$, $\lambda_2$, $\lambda_3$) as shown in FIG. 2 to drop and/or add the corresponding input channel 12. The center wavelengths ($\lambda_1$, $\lambda_2$, $\lambda_3$) of the input channels 12 are widely spaced to permit a selected filter function 22–24 to be shifted or parked at another area or center wavelength ($\lambda_1'$, $\lambda_2'$, $\lambda_3'$) between the optical channels 12 to permit the corresponding input channel to pass therethrough to the express port 26. For example, the fiber grating 15 is tuned to $\lambda_1$ to drop the optical channel 12 centered at $\lambda_1$, or tuned to shift the filter function 22' (shown in a dashed line) of the tunable fiber grating 15 to $\lambda_1'$, effectively parking the filter function between $\lambda_1$ and $\lambda_2$ to pass the optical channel at $\lambda_1$ to the express port.

Figure 3:
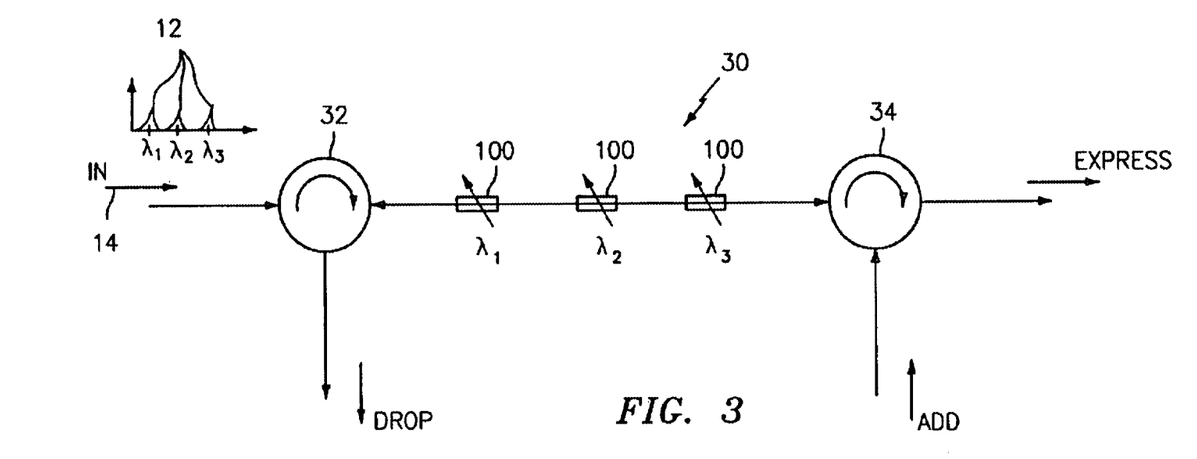
FIG. 3 is an optical schematic of an optical add-drop multiplexer having tunable chirped gratings, in accordance with the present invention.
Figure 4:
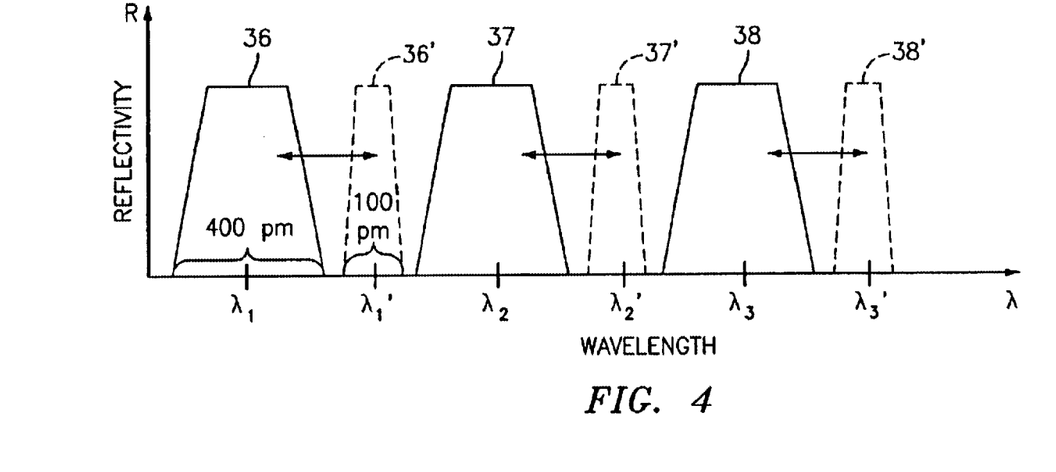
FIG. 4 is a graph showing grating filter parking between channels using tunable chirped gratings, in accordance with the present invention.

FIG. 3 an optical add/drop device (OADM) 32, generally shown as 30, that includes a plurality of tunable optical devices 100 between a pair of circulators 32,34 that replace the fiber gratings 15–17 of FIG. 1. As will be described in greater detail, each tunable optical device 100 includes a waveguide 102 having a chirped grating 112 that provides a wide filter function 36,37,38 at the center wavelength (e.g., at $\lambda_1,\lambda_2,\lambda_3$) of the corresponding optical channels, as shown in FIG. 4, and a narrower filter function 36',37',38' (shown in dashed lines) at another wavelength (e.g., at $\lambda_1',\lambda_2',\lambda_3'$) between the optical channels 12, when the grating 12 is strained (e.g. in compression). The invention may be used in the opposite fashion wherein the channel is blocked when in compression and parked between channels when not in compression, as will be described hereinafter. Alternatively, the tunable optical devices 100 can operate at two different compressive loads.

Figure 5:
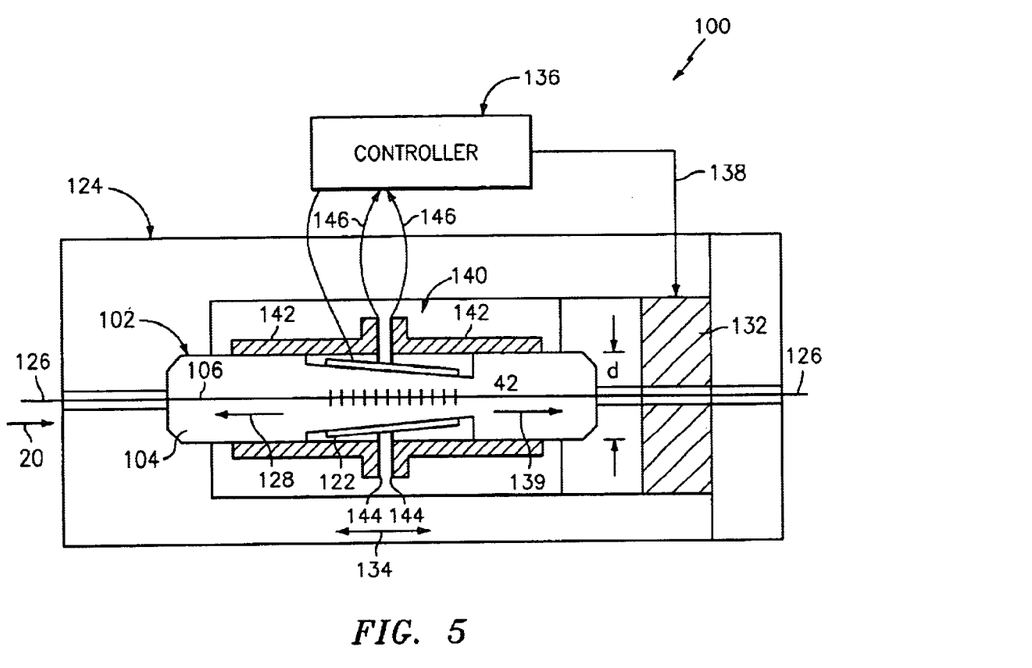
FIG. 5 is a side view of a tunable optical device in accordance with the present invention.
Figure 6:
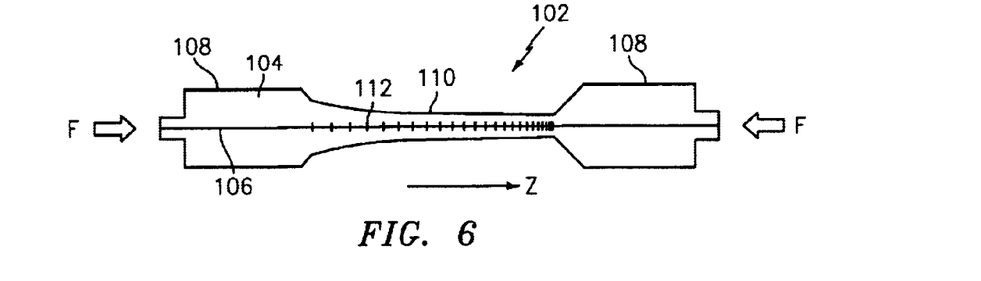
FIG. 6 is a side view of a grating element of a tunable optical device having a chirped grating written in a first "sense" in accordance with the present invention.

Referring to FIG. 5, a tunable optical device, generally shown as 100, comprises an optical Bragg grating element 102, best shown in FIG. 6. The grating element 102 is a bulk or large diameter waveguide, having an outer cladding 104 disposed about an inner core 106. The grating element may be etched, grounded or machined to form a generally "dog bone" shape, wherein the end portions 108 of the grating element has a larger diameter than the center portion 110 disposed therebetween. A chirped grating 112 is written or impressed within the portion of the core 106 disposed in the center portion 110 of the grating element 102. The center portion 110 is machined into a tapered form to allow different stresses to be applied along the grating length when the grating element 102 is compressed longitudinally by force F.

In the embodiment shown, the cross-sectional area of the center portion 110 of the grating element 102 is gradually reduced from one value to a second value in a quadratic fashion. In other words, the outer diameter of the center portion tapers quadradically from one end to the other as a function of the square root of the distance such that longitudinal compression of the element results in a linear increase in wavelength tuning of the chirped grating 112 along its length. This allows the grating chirp rate 114a–c to be increased or decreased depending on the 'sense' of the original chirp and the physical taper in the grating element 102.

Figure 7:
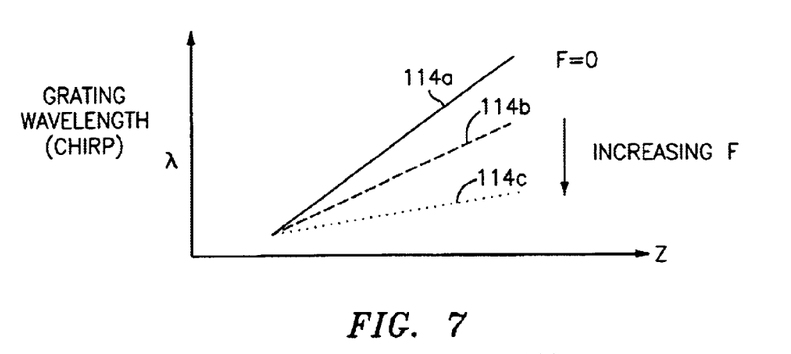
FIG. 7 is a graphical representation of the chirp rate of the grating element of FIG. 3 as the grating is longitudinally compressed.

For example, consider the grating element 102 depicted in FIG. 6 wherein the sense of the chirped grating 112 results in the Bragg wavelength increasing from left to right as depicted. In other words, the spacing of the gratings at the wide end of the center portion of the grating element is greater than the spacings of the gratings at the narrower end. The physical taper in the grating element 102 results in the longer wavelength having a higher sensitivity to compression load than the shorter wavelengths. Consequently, referring to FIG. 7, as the grating element is compressed longitudinally by force F, the grating chirp rate 114a–c decreases. Furthermore, the compressional loading of the grating element results in a reduction of the chirp bandwidth, as illustrated in FIGS. 8 and 9, and therefore, the dispersion of the grating increases (same group delay is attained over a smaller bandwidth).

Figure 8:
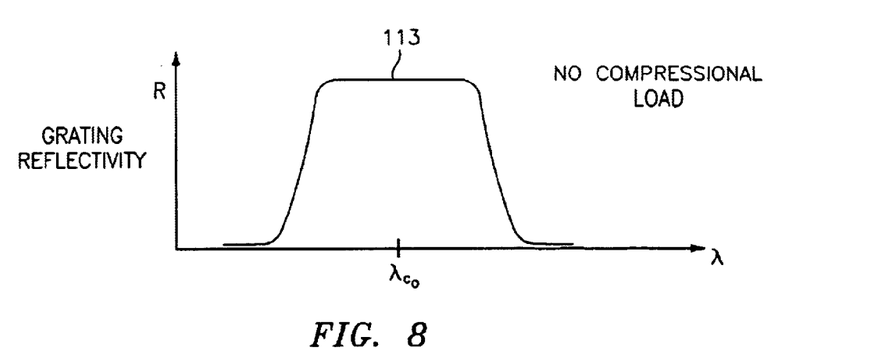
FIG. 8 is a graphical representation of the reflectivity profile of the grating element of FIG. 3 when no compressional load is applied.

Specifically, FIG. 8 shows that the chirp bandwidth 113 of the grating element 102 is relatively wide, when no compressional load is applied. FIG. 9 shows that the chirped bandwidth 115 of the grating 102 is reduced and the center wavelength $\lambda_{co}$ is shifted to $\lambda_{cl}$, when a compressional load is applied.

Figure 10:
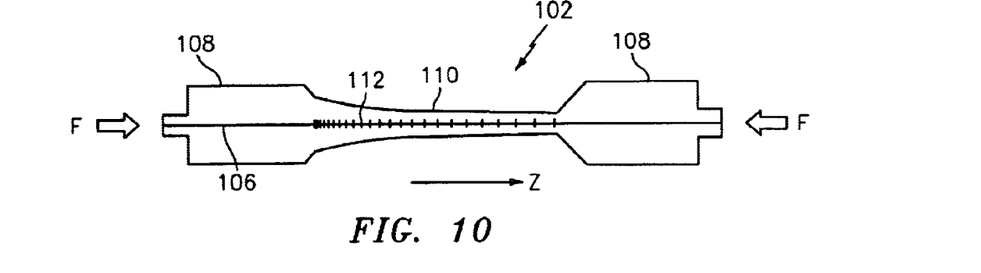
FIG. 10 is a side view of a grating element of a tunable optical device having a chirped grating written in a second "sense" in accordance with the present invention.
Figure 11:
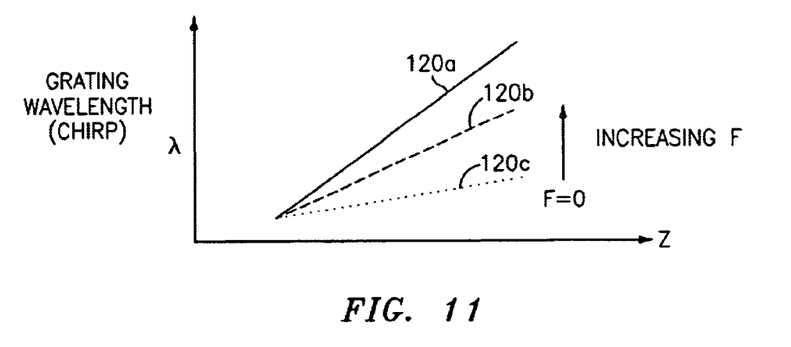
FIG. 11 is a graphical representation of the chirp rate of the grating element of FIG. 7 as the grating is longitudinally compressed.

Alternatively, as shown in FIG. 10, the original chirp may be written into the grating element 102 in the opposite sense, wherein the sense of the chirped grating results in the Bragg wavelength increasing from right to left as depicted. In other words, the spacing of the gratings at the wide end of the center portion 112 of the grating element 102 is less than the spacings of the gratings at the narrower end. The physical taper in the grating element results in the shorter wavelengths having a higher sensitivity to compression load than the longer wavelengths. Consequently, referring to FIG. 11, as the grating is compressed longitudinally by force F, the grating chirp rate 120a–c increases. Conversely to the grating element of FIG. 6, compressional loading of the element results in an increase of the chirp bandwidth.

Figure 9:
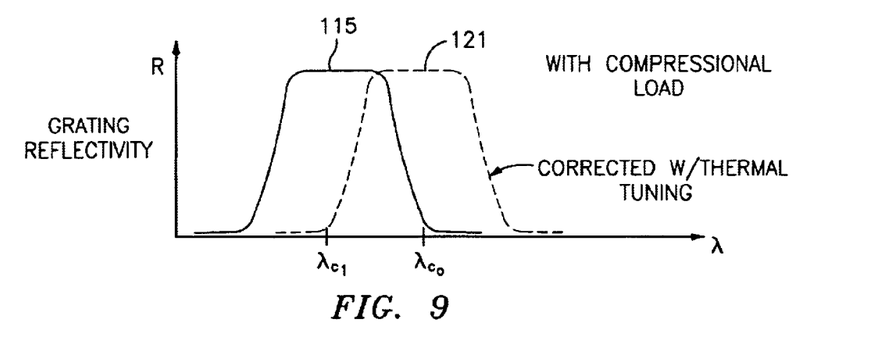
FIG. 9 is a graphical representation of the reflectivity profile of the grating element of FIG. 3 when a compressional load is applied.

As shown in FIG. 9, one limitation of this approach is the compressional tuning also tunes or shifts the overall center wavelength λco of the grating 112. This can cause an issue if the grating bandwidth does not overlap that of the signal at all times and over it's tunable range. This can be compensated by thermal tuning of the grating element, as shown in broken lines at 121 in FIG. 9. Thermal tuning would allow correction of any center wavelength caused by compressional tuning. Thermal tuning could be effected using either heating elements or peltier (TEC) cooler/heater elements 122, as shown in FIG. 5.

Referring to FIG. 6, the optical grating element 102 of the tunable optical device 100 is disposed within a compressing device or housing 124. The grating element comprises silica glass (SiO$_2$) having the appropriate dopants, as is known, to allow light to propagate along the inner core, and has an outer diameter (d) of at least 0.3 mm. The grating element 102 may be formed by using fiber drawing techniques now know or later developed that provide the resultant desired dimensions for the core and the outer dimensions, similar to that disclosed in co-pending U.S. patent application, Ser. No. 09/455,868 entitled "Large Diameter Optical Waveguide, Grating, and Laser", which is incorporated herein by reference in its entirety. The grating element 102 may then be etched, grounded or machined to form the "dogbone" shape. A pair of fibers or "pigtails" 126 may be attached to the ends of the grating element by known techniques, such as epoxy or glass fusion.

Alternatively, the optical grating element 102 may be formed by heating, collapsing and fusing a glass capillary tube to a fiber by a laser, filament, flame, etc., as is described in copending U.S. patent application Ser. No. 9/455,865, entitled "Tube-Encased Fiber Grating", which is incorporated herein by reference in its entirety. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

As shown in FIG. 5, the chirped Bragg grating 112 is written (embedded or imprinted) into the inner core 106 of the grating element 102. The Bragg grating 112 reflects a portion of the light as indicated by arrow 128, and passes the remaining wavelengths of the incident light (within a predetermined wavelength range), as indicated by arrow 130. The chirped grating 112, as is known, is an a periodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming A periodic Gratings in Optical Fibers", to Glenn, which are hereby incorporated by reference to the extent necessary to understand the present invention.

However, any wavelength-tunable grating or reflective element 112 embedded, written, etched, imprinted, or otherwise formed in the inner core 106 may be used if desired. As used herein, the term "grating" means any of such reflective elements. Further, the reflective element (or grating) 112 may be used in reflection and/or transmission of light.

Other materials and dimensions for the optical grating element 102 may be used if desired. For example, the grating element 102 may be made of any glass, e.g., silica, phosphate glass, or other glasses.

An actuator 132, such as a piezoelectric actuator, axially compresses the grating element 102 within the compression device or housing 124, as indicated by arrows 134. Accordingly, the PZT actuator 132 provides a predetermined amount of force to compress the grating element 102, and thereby tune the grating 112 to a desired center wavelength. In response to a control signal generated by a controller 136 via conductor 138, the PZT actuator 132 is energized to provide the appropriate compression force necessary to tune the grating element to the desired chirp (i.e., bandwidth and center wavelength of the reflectivity profile) of the grating 112. The controller 136 adjusts the expansion and retraction of the actuator 132 in response to a displacement sensor 140 that provides feedback representative of the strain or compression of the grating element 102 to form a non-optical closed-loop control configuration. In other words, light 12 propagating through the network or device is not used to provide feedback for the tuning of the grating 112.

While the actuator is described as a piezoelectric actuator, the present invention contemplates an actuator 132, such as a stepper motor or other type of motor whose rotation or position can be controlled, that may be connected by a mechanical linkage 62, e.g., a screw drive, linear actuator, gears, and/or a cam, to the movable block (or piston) 131 which causes the block 131 to move as indicated by arrows 133, which is similar to that described in U.S. Pat. No. 6,229,827 entitled "Compression-Tuned Bragg Grating and Laser" and U.S. patent application Ser. No. 09/752,332 entitled "Actuator Mechanism for Tuning an Optical Device", which are incorporated herein by reference in their entirety.

In one embodiment, the displacement sensor 140 includes a pair of capacitive elements 142, similar to that disclosed in co-pending U.S. patent application Ser. No. 09/519,802 entitled, "Tunable Optical Structure Featuring Feedback Control", filed Mar. 6, 2000, which is incorporated by reference in its entirety. The controller measures the capacitance between the capacitive plates 144; and provides a sensed signal via conductors 146, indicative of the measured capacitance, to the controller 136. As the grating element 102 is strained, the gap between the parallel capacitive plates 144 will vary, thereby causing the capacitance to change correspondingly. The change in capacitance may be directly or inversely proportional to the change in the chirp of the grating 112, depending on the sense of the chirped grating.

Although the invention has been described with respect to using a capacitor to measure the gap distance, it should be understood by those skilled in the art that other gap sensing techniques may be used, such as inductive, optical, magnetic, microwave, time-of-flight based gap sensors, similar to those shown in U.S. patent application Ser. No. 09/950,509 entitled "Tunable Optical Structure Featuring Feedback Control", which is incorporated herein by reference in its entirety. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the grating element 54, one should recognize that the grating units may be accurately and repeatedly compressed/tuned to allow the grating unit to operate in an open loop mode.

Alternatively, the grating 112 may be tuned by mechanically stressing (i.e. tension, bending) the grating elements 102, or varying the temperature of the grating (i.e., using a heater), such as that described in U.S. Pat. No. 5,007,705, entitled "Variable Optical Fiber Bragg Filter Arrangement", to Morey et al., which is incorporated herein by reference. Furthermore, while the grating 112 has been described as being within a grating element 102 in the form of a bulk waveguide, one will appreciate that the grating may be written into a fiber, wherein the grating may be tuned thermally or mechanically (compression or tension).

Figure 12:
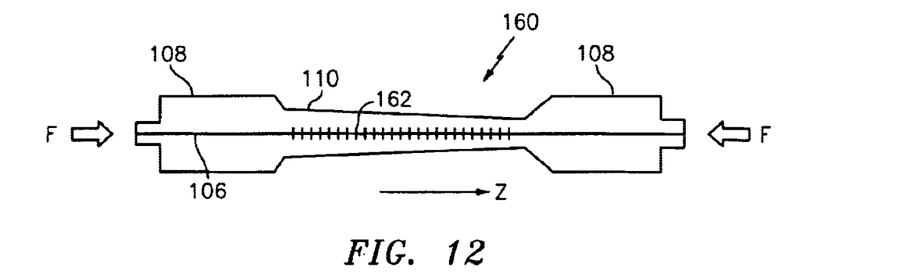
FIG. 12 is a side view of an alternative embodiment of a grating element in accordance with the present invention.

FIG. 12 shows another embodiment of a grating element 160 similar to the grating element 102 of FIG. 6. Contrary to grating element 102, the taper of the center portion 110 of grating element 160 is linear and the grating 162 is periodic. Consequently, as the grating elements are longitudinally compressed, the grating becomes variably chirped, and provides a quadratic chirp in the grating.

Figure 13:
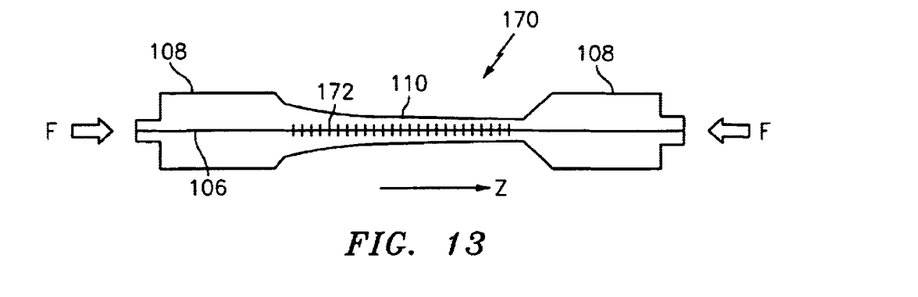
FIG. 13 is a side view of an alternative embodiment of a grating element in accordance with the present invention.

FIG. 13 shows yet another embodiment of a grating element 170 similar to the grating element 102 in FIG. 6. Contrary to grating element 102, the grating 172 of grating element 170 is periodic such that the grating becomes linearly chirped as the grating element 170 is longitudinally compressed.

Figure 14:
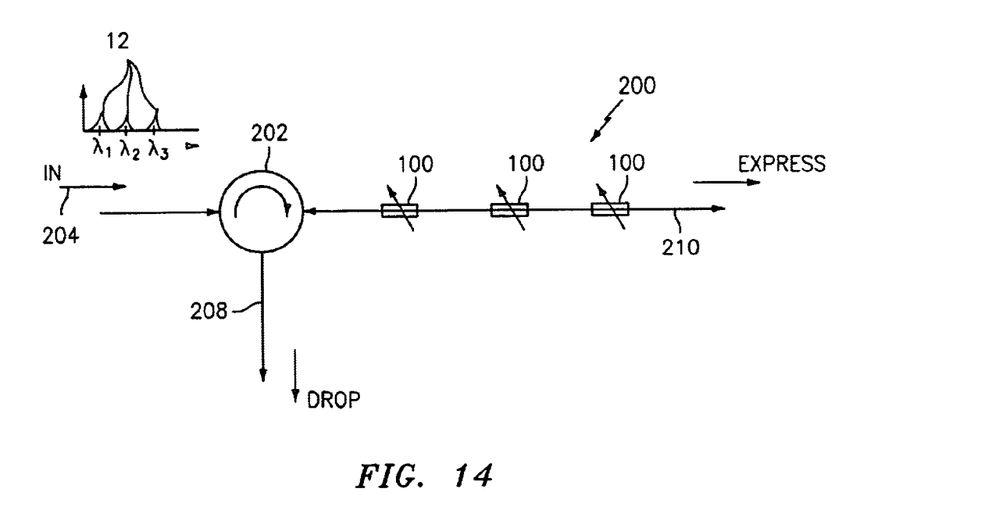
FIG. 14 is an optical schematic of an optical filter having tunable chirped gratings in accordance with the present invention.

While the tunable device 100 of FIG. 5 has been described hereinbefore within the context of an OADM 10, one will appreciate that the tunable device 100 may be used with an optical bandpass filter. FIG. 14 is illustrative of an optical bandpass filter 200 that includes a circulator 202 for directing a DWDM input signal 204 to a plurality of tunable grating devices 100 which reflect back to the circulator a selected optical channel 12 to an output port 208 of the circulator 202, and passes the remaining channels to optical conductor 210.

As shown in FIGS. 4 and 14 the use of the chirped grating 112 allows the bandwidth of the filter function of the grating to be reduced and parked between a pair of closing spaced optical channels 222 (i.e., 50 GHz, 100 GHz) to permit the respective channel to pass through to optical conductor 210. As described hereinbefore, longitudinal compression of the grating element 102 reduces the bandwidth of the reflectivity profile 115 (see FIG. 9) of the grating 112; and the reduction of the applied compressional load broadens the bandwidth of the reflectivity profile 113 (see FIG. 8) of the grating.

The ability to vary the width of the reflective profile and its center frequency $\lambda co$ enables the filter function of a desired grating 112 to be parked between a pair of closely spaced channels 12 to permit the respective channel to be transmitted, but then enables the bandwidth of the reflective profiles 22'-24' of the grating 112 to be increased and centered at the desired channel wavelength $\lambda_1'$, $\lambda_2'$, $\lambda_3'$ to filter that desired channel 12 centered at $\lambda_1$ from the DWDM input signal 204.

While it has been shown that a single grating is used to filter one channel 12 of the DWDM input signal 204, one will recognize that one grating may be tuned to increase the bandwidth of the reflectivity profile to reflect a plurality of channels.

It is further contemplated by the present invention that the grating may be blazed as described in U.S. patent application Ser. No. 10/098,923, which is incorporated herein by reference in its entirety.

It is further contemplated that alternative to thermal tuning, the grating may be temperature compensated such as that shown in U.S. patent application Ser. Nos. 09,519,240 and 09/699,940, each entitled "Temperature Compensated Optical Device", which are incorporated herein by reference in their entirety.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. A tunable optical filter for dropping an optical channel from an input signal having a plurality of input channels, the filter comprising:
   a plurality of concatenated tunable filter parking devices, each of which including:
      an optical waveguide including:
         an outer cladding disposed about an inner core, a portion of the cladding including a tapered region, the cladding having a minimum cross-sectional dimension of 0.3 mm; and
         a chirped grating written in the inner core of the tapered region of the cladding; and
      a light directing device that directs the input signal to the tunable filter parking device and directs at least one drop signal that is reflected from at least one of the tunable filter parking device to an output port.

2. The tunable filter parking device of claim 1, wherein the optical waveguide comprises:
   an optical fiber, having a reflective element written therein; and
   a tube, having the optical fiber and the reflective element encased therein along a longitudinal axis of the tube, the tube being fused to at least a portion of the fiber.

3. The tunable filter parking device of claim 1, further includes a compressing device for compressing simultaneously and axially the optical waveguide, wherein the chirped grating is disposed along an axial direction of the optical waveguide.

4. The tunable filter parking device of claim 1, further comprising a straining device for tensioning axially the optical waveguide to tune the chirped grating, wherein the chirped grating is disposed along an axial direction of the optical waveguide.

5. The tunable filter parking device of claim 3, further includes an athermal element for varying the temperature of the unchirped grating to tune the unchirped grating to a selected center wavelength.

6. The tunable filter parking device of claim 3, wherein the tunable filter parking device comprises a displacement sensor that includes a capacitance sensor coupled to the optical waveguide for measuring the change in the capacitance that depends on the change in the displacement of the optical waveguide.

7. The tunable filter parking device of claim 1, wherein the tapered region varies quadradically from a first end to a second end, the first end having a greater cross-section than the second end.

8. The tunable filter parking device of claim 1, wherein the tapered region varies linearly from a first end to a second end, the first end having a greater cross-section than the second end.

9. The tunable filter parking device of claim 7, wherein the chirped grating is written in the inner core such that the Bragg wavelength of the chirped grating increases from the first end to the second end of the tapered region.

10. An optical add/drop multiplexer for dropping and/or adding an optical channel of an input signal having a plurality of input channels, the optical add/drop multiplexer comprising:
a plurality of concatenated tunable filter parking devices, each of which including:
an optical waveguide including:
an outer cladding disposed about an inner core, a portion of the cladding including a tapered region, the cladding having a minimum cross-sectional dimension of 0.3 mm; and
a chirped grating written in the inner core of the tapered region of the cladding;
a first light directing device that directs the input signal to the tunable filter parking devices and directs at least one reflected drop signal to a drop port; and
a second light directing device that directs an add signal to the tunable filter parking devices and directs at least one reflected add signal to an express port.

11. The optical add/drop multiplexer of claim 10 wherein the optical waveguide comprises:
an optical fiber, having a reflective element written therein; and
a tube, having the optical fiber and the reflective element encased therein along a longitudinal axis of the tube, the tube being fused to at least a portion of the fiber.

12. The optical add/drop multiplexer of claim 10 further includes a compressing device for compressing simultaneously and axially the optical waveguide, wherein the chirped grating is disposed along an axial direction of the optical waveguide.

13. The optical add/drop multiplexer of claim 10, further comprising a straining device for tensioning axially the optical waveguide to tune the chirped grating, wherein the chirped grating is disposed along an axial direction of the optical waveguide.

14. The optical add/drop multiplexer of claim 12, further includes an athermal element for varying the temperature of the unchirped grating to tune the unchirped grating to a selected center wavelength.

15. The optical add/drop multiplexer of claim 12, wherein the tunable filter parking device comprises a displacement sensor that includes a capacitance sensor coupled to the optical waveguide for measuring the change in the capacitance that depends on the change in the displacement of the optical waveguide.

16. The optical add/drop multiplexer of claim 10, wherein the tapered region varies quadradically from a first end to a second end, the first end having a greater cross-section than the second end.

17. The optical add/drop multiplexer of claim 10, wherein the tapered region varies linearly from a first end to a second end, the first end having a greater cross-section than the second end.

18. The optical add/drop multiplexer of claim 16, wherein the chirped grating is written in the inner core such that the Bragg wavelength of the chirped grating increases from the first end to the second end of the tapered region.

* * * * *